United States Patent [19]

Breining

[11] Patent Number: 4,517,481

[45] Date of Patent: May 14, 1985

[54] MODULAR SWITCH HOUSING FOR AN ELECTRIC MOTOR

[75] Inventor: Frank E. Breining, Jackson, Mich.

[73] Assignee: Airmaster Fan Company, Jackson, Mich.

[21] Appl. No.: 500,564

[22] Filed: Jun. 2, 1983

[51] Int. Cl.³ .............................................. H02K 5/00
[52] U.S. Cl. ...................................... 310/71; 310/89; 416/170 R
[58] Field of Search ................. 417/423 R; 310/68 A, 310/68 C, 71, 89; 416/170 R; 339/147 R

[56] References Cited

U.S. PATENT DOCUMENTS

| | | | |
|---|---|---|---|
| 1,443,205 | 1/1923 | Bijur | 310/89 |
| 1,727,849 | 9/1929 | Wise et al. | 310/89 |
| 2,100,923 | 11/1937 | Schmidt et al. | 230/273 |
| 2,123,448 | 7/1938 | Weber | 230/273 |
| 2,182,083 | 12/1939 | Jepson et al. | 171/222 |
| 2,658,666 | 11/1953 | Krzesiewski | 230/259 |
| 2,703,381 | 1/1955 | Jepson | 318/325 |
| 3,248,582 | 4/1966 | Brown | 310/71 |
| 3,395,298 | 7/1968 | Shifley | 310/72 |
| 3,619,641 | 11/1971 | Ballard | 307/149 |
| 3,631,275 | 12/1971 | Conrad et al. | 310/71 |
| 4,307,508 | 12/1981 | Anderson et al. | 310/71 |
| 4,390,219 | 6/1983 | Beehler | 310/71 |

FOREIGN PATENT DOCUMENTS

| | | | |
|---|---|---|---|
| 76620 | 6/1977 | Japan | 310/89 |
| 20140 | 2/1982 | Japan | 310/71 |

Primary Examiner—Carlton R. Croyle
Assistant Examiner—Donald E. Stout
Attorney, Agent, or Firm—Beaman & Beaman

[57] ABSTRACT

The invention pertains to an electric fan wherein the fan motor casing is enclosed at its rear end by a dome. The power cord, switch and motor capacitor are mounted upon the dome, and the electrical conductors associated therewith are connected to the motor components through a separable connector permitting the switch, capacitor and power cord to be quickly removed from the motor casing facilitating repair, maintenance and replacement of these components.

4 Claims, 4 Drawing Figures

U.S. Patent     May 14, 1985     4,517,481
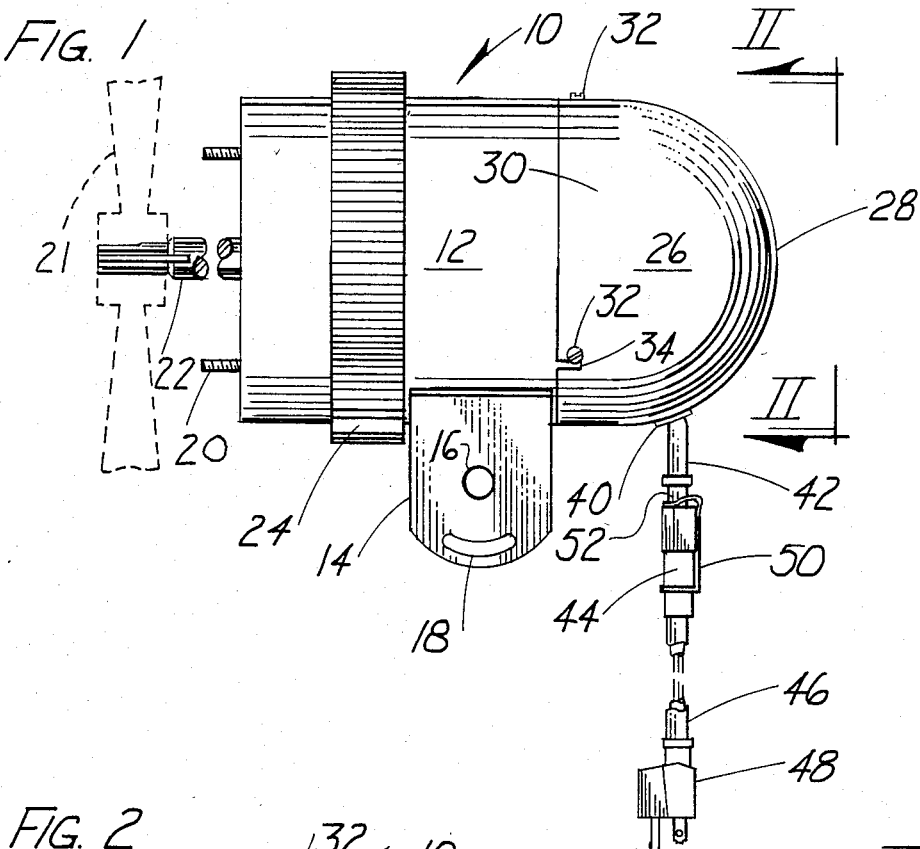
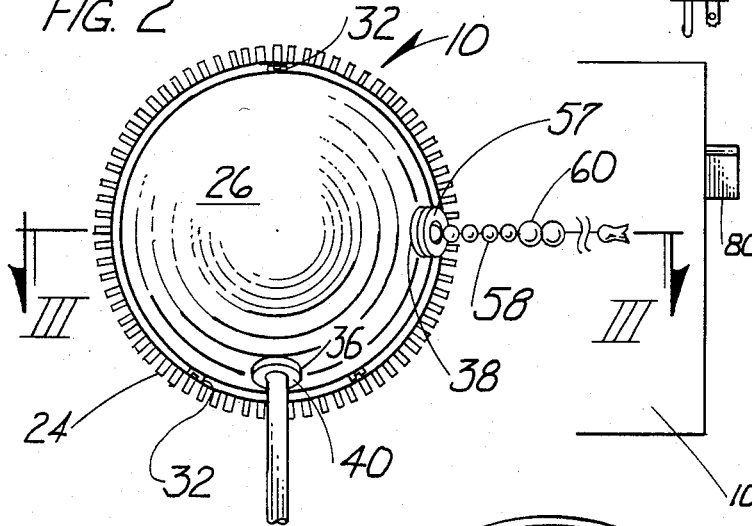
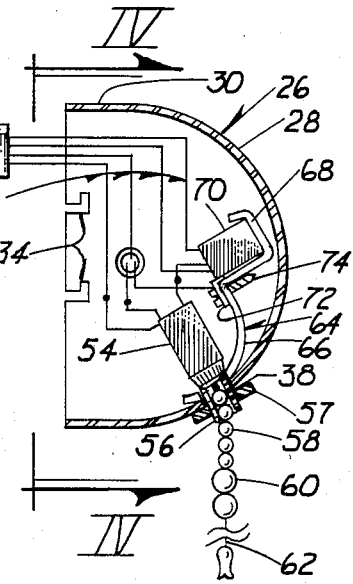
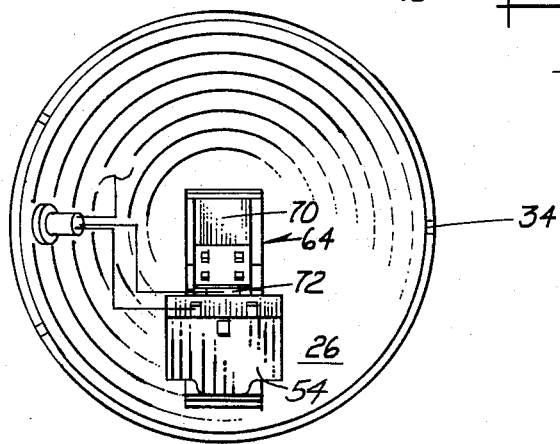

MODULAR SWITCH HOUSING FOR AN ELECTRIC MOTOR

BACKGROUND OF THE INVENTION

Electric fans, particularly those used in industrial applications, are often mounted at elevated locations, and such fans often include a switch in the form of a pull cord controlling operation. The fans include a motor casing enclosed at its rear end by a dome removably attached to the casing and the switch is often mounted within the motor dome. In the usual construction the motor capacitor is held within a bracket affixed to the motor casing within the confines of the dome or is located exteriorly of the casing.

Experience indicates that electric fan failure often occurs because of a faulty switch or motor capacitor, and the majority of maintenance pertains to the replacement of one or both of these components. Due to the elevated location of the fans, replacement of the switch or capacitor is complicated, requiring a ladder or other elevated support, and considerable time and expenses is normally entailed in the servicing of this type of fan.

While it is known to locate fan switches within the end portion or dome of a fan motor casing, such as shown in U.S. Pat. Nos. 2,100,923; 2,123,448 and 2,658,666, and while the mounting of motor capacitors within shields or covers located at the end of the motor is known, such as shown in U.S. Pat. Nos. 2,703,381 and 3,395,298, prior constructions have not overcome the aforementioned problems, and the invention is directed toward producing an electric fan having superior maintenance and assembly procedures.

It is an object of the invention to provide an electric fan utilizing a dome mounted upon the end of the fan motor casing wherein the electric switch and the capacitor for the fan motor are both mounted upon the dome, and are removed from the fan with the dome.

Another object of the invention is to provide an electric fan assembly wherein a fan motor dome supports both the electric motor switch and capacitor, and the conductors associated therewith are connected to the motor electrical components through a releasable connector wherein the dome may be readily removed from the motor casing with a minimum of effort.

Yet another object of the invention is to provide an electric motor assembly utilizing a dome mounted upon a fan motor casing wherein fasteners attaching the dome to the casing are irregularly located upon the dome limiting assembly of the dome to the casing to a single predetermined orientation.

Yet another object of the invention is to provide an electric fan assembly wherein the fan switch and motor capacitor are located within the motor casing end dome, and the capacitor is mounted upon a bracket supported within the dome by the switch to facilitate assembly and minimize assembly procedures.

In the practice of the invention the rear end of an electric fan motor casing is enclosed by a bulbous sheet metal dome attached to the casing by three screws received within bayonet slots defined in the dome. The fasteners, and slots, are irregularly disposed about the dome circumference whereby assembly of the dome to the casing is limited to a single orientation.

The power cord for the fan is mounted to the dome, and an electric pull switch is also mounted in the dome extending through the wall thereof and connected to the power cord conductors. Further, the motor capacitor is mounted within the dome also connected to the switch and power cord. These conductors are attached to one half of a two part electrical connector, the other part thereof being connected to the motor components whereby assembly of the electrical connector parts establishes electrical connections between the motor field coil and the dome mounted components.

The capacitor is mounted within the dome upon a sheet metal bracket attached to the dome by the assembly of the switch to the dome. In this manner assembly is achieved with a minimum of machining and second operations, and yet the capacitor is firmly located within the dome at a given location. The capacitor can be readily removed from the bracket for replacement purposes, and preferably a standard capacitor having a mounting tang is employed whereby a fastener extending through the tang attaches the same to the bracket.

BRIEF DESCRIPTION OF THE DRAWINGS

The aforementioned objects and advantages will be apparent from the following description and accompanying drawings wherein:

FIG. 1 is an elevational view of a fan motor assembly in accord with the invention, FIG. 2 is an end elevational view of the assembly of FIG. 1 as taken from the right end thereof along Section II—II, FIG. 3 is a sectional view, partially schematic, taken through the motor dome, and FIG. 4 is an end, elevational view as taken from the left of FIG. 3 along Section IV—IV, the conductors being eliminated for purpose of illustration.

DESCRIPTION OF THE PREFERRED EMBODIMENT

A fan motor assembly incorporating the concepts of the invention is illustrated in FIG. 1 wherein the assembly includes a motor generally indicated at 10 having a cylindrical casing 12. A mounting bracket 14 is affixed to the casing, such as by welding, bolts or rivets, and the bracket includes a hole 16 for receiving a pivot pin whereby the casing may be mounted upon a supporting bracket, not shown, which may be attached to a wall surface, floor stand or other conventional fan support. The bracket includes an adjustment screw receiving slot 18 for locking the angular position of the casing.

The front end of the casing 12 includes threaded studs 20 extending therefrom whereby a conventional fan blade guard, or similar structure, may be attached to the casing and the fan blade 21, shown in dotted lines, is attached to the motor driveshaft 22 in the normal manner. Cooling of the motor casing is augmented by use of the heat exchanger ring 24 encircling the casing, and including a plurality of radial fins which aids in transmitting the heat generated within the motor to the atmosphere.

The rear end of the motor casing 12 is encased by a sheet metal dome 26. The dome includes a substantially spherical portion 28 blending into the cylindrical portion 30 which telescopes over the adjacent motor casing portion. The dome is affixed to the motor casing by three screws 32 threaded into the motor casing and bayonet type offset slots 34 are defined in the dome portion 30 at corresponding locations whereby the dome may be readily affixed to the casing and removed therefrom merely by loosening the screws slightly, rotating the dome and sliding the dome from the casing.

Assembly of the dome to the casing is achieved by the reversal of the aforementioned procedure.

In order to insure that the dome is always attached to the casing in the desired rotative orientation the screws 32 and slots 34 are irregularly positioned about the circumference of the dome portion 30. Preferably, one screw is located at the uppermost portion of the casing, while the other two screws are located adjacent the lower regions of the casing, as will be appreciated from FIG. 2. However, it is significant that the spacing between the screws is not 120°.

The dome 26 is provided with two holes 36 and 38. The hole 36 receives the power cord grommet 40 through which the power cord 42 extends. The power cord includes a connector 44 which attaches to the main length of the cord 46 which includes conventional grounded plug 48. The connector parts are maintained in assembled relationship against inadvertent axial pulls by a sheet metal clamp 50 mounted upon the connector 44 having a hook portion 52 engaging a radial shoulder upon the connector. Merely by displacing the clamp 50 the parts of connector 44 may be pulled apart separating the cord 46 from the shorter power cord 42.

The pull switch 54 includes an elongated threaded stem 56 which extends through the dome hole 38, and the stem is attached to the dome by the nut 57 in the known manner. The beaded chain 58 extends through the stem whereby a pull upon the chain operates the switch, and the chain connector includes an enlarged link or element 60 attaching the pull cord 62 to the chain 58. The enlarged link 60 prevents the chain from snapping back into the stem 56 in the event the cord 62 is broken during tensioning.

A sheet metal bracket 64 having a configuration as will be apparent from FIGS. 3 and 4 is attached interiorly to the dome by the switch threaded stem 56. The bracket 64 includes a hole through which the stem extends whereby tightening of the nut 57 draws the switch body into engagement with the bracket firmly mounting the bracket within the dome.

The bracket 64 includes an arcuate portion 66, and a formed portion defining a notch 68 for receiving the motor capacitor 70. The capacitor 70 has a rectangular body and is closely received within the notch 68 and a metal tang 72 extending from the thermoplastic capacitor body is bent at right angles to the length of the capacitor to overlay the bracket portion 66 as apparent in FIG. 3. The tang 72 includes a screw receiving hole through which the screw 74 is inserted and is threaded into a hole defined in the bracket. In this manner the capacitor is firmly connected to the bracket 64 and supported by the dome 26.

Appropriate electrical conductors in the form of wires 76 are used to interconnect the power cord 42, as schematically represented in FIG. 3, the switch 54 and the capacitor 70. These conductors are connected to an electrical connector 78 which cooperates with the connector 80 mounted upon the motor assembly having appropriate conductors, not shown, which connect to the motor field coil and other electrical components of the motor located within the casing 12. Thus, by interconnecting the conductor parts 78 and 80 electrical connection is made between the components within the dome and the motor components within the casing.

From the above description it will be appreciated that the dome 26 and its associated components, namely the switch 54, capacitor 70 and pull cord 62, may be readily attached to or removed from the motor casing as an assembly. It is only necessary to partially rotate the screws 32 to remove the dome and its components from the motor casing 12, and separating the electrical connector parts 78 and 80, and the parts of the power cord connector 44, permits the dome and its components to be removed as a unit.

The aforementioned construction simplifies the assembly of the switch and capacitor to the motor 10 as compared with previous fan motor arrangements and for purposes of maintenance and repair, it is possible for the workman to replace the dome and its components in their entirety very quickly with a minimum of skill. Even though the fan may be mounted at an elevated location and requires maintenance personnel to use a ladder, merely by the use of a screwdriver the motor and capacitor can be quickly replaced, and as these two components are those which require the most frequent servicing, the aforedescribed relationship minimizes fan maintenance costs and minimizes fan downtime.

It is appreciated that various modifications to the inventive concepts may be apparent to those skilled in the art without departing from the spirit and scope of the invention.

I claim:

1. In an electric fan having an electric motor having a field coil, a housing including a casing, a front driveshaft end and a rear end, mounting means defined on said casing, the housing including a dome enclosing the motor rear end, and electrical conductors connected to the motor field coil, the improvement comprising an electric switch mounted within the housing dome, a motor capacitor mounted within the housing dome, a power cord mounted upon said housing dome extending thereunto, flexible electric conductors within said dome interconnecting said power cord, switch and capacitor, an electric connector within said housing dome having interconnectable and disconnectable first and second parts, said first connector part being electrically connected to said flexible conductors, said second connector part being electrically connected to the motor field coil, and fastening means releasably attaching said dome to the motor casing whereby release of said fasteners and disconnecting of said electric connector parts permits unitary removal and replacement of the dome, power cord, switch and capacitor.

2. In an electric fan as in claim 1, a bracket mounted within the dome, capacitor mounting means defined on said bracket, said capacitor being mounted upon said bracket.

3. In an electric fan as in claim 2, said capacitor mounting means including a pocket defined thereon, said capacitor being received within said pocket, a tang defined upon said capacitor, and a screw extending through said tang threaded into a hole defined upon said bracket.

4. In an electric fan as in claim 1, said fastening means attaching the dome to the motor casing including screws threaded into the motor casing cooperating with bayonet slots defined in the dome, said screws and slots being irregularly spaced permitting only a single orientation of assembly of the dome upon the motor casing.

* * * * *